United States Patent
Lei et al.

(10) Patent No.: US 12,542,334 B2
(45) Date of Patent: Feb. 3, 2026

(54) ELECTRODE ASSEMBLY, BATTERY CELL, BATTERY AND ELECTRICAL DEVICE

(71) Applicant: CONTEMPORARY AMPEREX TECHNOLOGY CO., LIMITED, Ningde (CN)

(72) Inventors: Yuyong Lei, Ningde (CN); Peng Wang, Ningde (CN); Zhijun Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 586 days.

(21) Appl. No.: 18/058,771

(22) Filed: Nov. 25, 2022

(65) Prior Publication Data

US 2023/0087166 A1    Mar. 23, 2023

Related U.S. Application Data

(63) Continuation of application No. PCT/CN2021/127720, filed on Oct. 29, 2021.

(30) Foreign Application Priority Data

Dec. 17, 2020 (CN) .......................... 202023057229.9

(51) Int. Cl.
*H01M 50/538* (2021.01)
*H01M 10/0525* (2010.01)
(Continued)

(52) U.S. Cl.
CPC ..... *H01M 50/538* (2021.01); *H01M 10/0525* (2013.01); *H01M 10/0583* (2013.01);
(Continued)

(58) Field of Classification Search
CPC ........... H01M 50/538; H01M 10/0525; H01M 10/0583; H01M 10/0587; H01M 50/46;
(Continued)

(56) References Cited

U.S. PATENT DOCUMENTS

| | | | |
|---|---|---|---|
| 2001/0036574 A1 | 11/2001 | Fukuda et al. | |
| 2009/0208832 A1* | 8/2009 | Beard | H01M 10/0459 156/194 |
| 2012/0326665 A1* | 12/2012 | Yin | B60L 53/302 429/100 |

FOREIGN PATENT DOCUMENTS

| | | |
|---|---|---|
| CN | 102282716 A | 12/2011 |
| CN | 103633378 A | 3/2014 |

(Continued)

OTHER PUBLICATIONS

English machine translation of Morikawa (JP2017059326A).*
(Continued)

*Primary Examiner* — Matthew T Martin
*Assistant Examiner* — Felicity B Alban
(74) *Attorney, Agent, or Firm* — K&L Gates LLP

(57) ABSTRACT

An electrode assembly is provided and includes: a first electrode sheet comprising a first flat and straight portion and a first tab connected to an end portion of the first flat and straight portion along a first direction; a second electrode sheet comprising a second flat and straight portion, the first flat and straight portion and the second flat and straight portion being stacked along a second direction perpendicular to the first direction; a first separator and a second separator, the first separator comprising a first separation portion, a first bent portion and a first extension portion, and the second separator comprising a second separation portion, wherein the first separation portion and the second separation portion are positioned on both sides of the second flat and straight portion along the second direction respectively, and separate the first flat and straight portion from the second flat and straight portion.

14 Claims, 8 Drawing Sheets

(51) Int. Cl.
*H01M 10/0583* (2010.01)
*H01M 10/0587* (2010.01)
*H01M 50/46* (2021.01)
*H01M 50/533* (2021.01)

(52) U.S. Cl.
CPC ....... *H01M 10/0587* (2013.01); *H01M 50/46* (2021.01); *H01M 50/533* (2021.01); *H01M 2220/20* (2013.01)

(58) Field of Classification Search
CPC .......... H01M 50/533; H01M 2220/20; H01M 10/0431; H01M 50/103; H01M 50/15; H01M 50/176; H01M 50/186; H01M 50/466; H01M 50/586; Y02E 60/10; Y02P 70/50
See application file for complete search history.

(56) References Cited

FOREIGN PATENT DOCUMENTS

| CN | 107210492 | A | 9/2017 |
|---|---|---|---|
| CN | 208062214 | U | 11/2018 |
| CN | 208173732 | U | 11/2018 |
| CN | 109088091 | A | 12/2018 |
| CN | 112467230 | A | 3/2021 |
| CN | 214254487 | U | 9/2021 |
| JP | 2003303624 | A | 10/2003 |
| JP | 2011129299 | A | 6/2011 |
| JP | 2014067633 | A | 4/2014 |
| JP | 5811966 | B2 * | 11/2015 |
| JP | 2017059326 | A | 3/2017 |
| JP | 6486801 | B2 | 3/2019 |
| KR | 20170006633 | A | 1/2017 |
| WO | B808210 | A1 | 10/1988 |

OTHER PUBLICATIONS

English machine translation of Minamigata et al. (JP5811966B2).*
English machine translation Tasai et al. (JP2014067633A).*
English machine translation Dobashi et al. (JP2011129299A).*
Decision to Grant a Patent received in the corresponding Japanese application 2022-554325, mailed on Mar. 4, 2024.
The extended European search report received in the corresponding European application 21905332.9, mailed on Feb. 9, 2024.
Notice of Allowance received in the corresponding Korean application 10-2022-7031433, mailed on Dec. 4, 2024.
International Search Report received in PCT Application PCT/CN2021/127720 on Dec. 23, 2021.
Notice of Reasons for Refusal received in the corresponding Japanese application 2022-554325, mailed on Aug. 18, 2023.

* cited by examiner

ELECTRODE ASSEMBLY, BATTERY CELL, BATTERY AND ELECTRICAL DEVICE

CROSS-REFERENCE TO RELATED APPLICATIONS

This application is a continuation of International Application PCT/CN2021/127720, filed Oct. 29, 2021, which claims the priority of the Chinese patent application CN202023057229.9, filed on Dec. 17, 2020, entitled "ELECTRODE ASSEMBLY, BATTERY CELL, BATTERY AND ELECTRICAL DEVICE", which are incorporated in their entireties by reference.

TECHNICAL FIELD

The present disclosure relates to the field of battery, and in particular, to an electrode assembly, a battery cell, a battery, and an electrical device.

BACKGROUND

Energy conservation and pollution reduction is critical to the sustainable development of the automobile industry. In view of this, electric vehicles have become an important part in the sustainable development of the automobile industry due to their advantages of energy saving and environmental protection. For electric vehicles, the battery technology is an important factor for their development.

In the development of the battery technology, in addition to the performance improvement of a battery, the safety issue also cannot be ignored. If the safety of the battery cannot be guaranteed, the battery cannot be used. Therefore, how to enhance the safety of the battery is an urgent technical problem to be solved in the battery technology.

SUMMARY

The present disclosure provides an electrode assembly, a battery cell, a battery and an electrical device, which can reduce the risk of short circuit and improve safety.

In a first aspect, an embodiment of the present application provides an electrode component including: at least one first electrode sheet comprising a first flat and straight portion and a first tab connected to an end portion of the first flat and straight portion along a first direction; at least one second electrode sheet opposite in polarity to the first electrode sheet, and comprising a second flat and straight portion, the first flat and straight portion and the second flat and straight portion being stacked along a second direction perpendicular to the first direction; a first separator and a second separator for separating the first electrode sheet from the second electrode sheet, the first separator comprising a first separation portion, a first bent portion and a first extension portion, and the second separator comprising a second separation portion, wherein the first separation portion and the second separation portion are positioned on both sides of the second flat and straight portion along the second direction respectively, and separate the first flat and straight portion from the second flat and straight portion, the first extension portion is at least partially arranged on a side of the second flat and straight portion facing away from the first separation portion, and is positioned between the first flat and straight portion and the second flat and straight portion, the first bent portion connects the first separation portion to the first extension portion, and is positioned on a side of the second flat and straight portion close to the first tab along the first direction, and the first bent portion and the first extension portion are configured to separate the second flat and straight portion from the first tab when the first tab is inserted between the first flat and straight portion and the second flat and straight portion.

In the electrode assembly of an embodiment of the present application, the first bent portion and the first extension portion can separate the second flat and straight portion from the first tab when the first tab is inserted between the first flat and straight portion and the second flat and straight portion, thus reducing the risk of contact between the first tab and the second flat and straight portion and improving safety performance. The first bent portion is integrally connected with the first extension portion, which can prevent the first tab from being inserted between the first extension portion and the second flat and straight portion, so as to reduce the risk of short circuit.

In some embodiments, both ends of the first flat and straight portion along the first direction include a first end portion and a second end portion respectively, and the first tab is connected to the first end portion. both ends of the second flat and straight portion along the first direction include a third end portion and a fourth end portion respectively, the third end portion is closer to the first tab than the fourth end portion, and the third end portion is at least partially wrapped by the first bent portion. When the first tab is bent under pressure, the first bent portion can separate the first tab from the third end portion, thereby reducing the risk of the first tab overlapping the third end portion and improving safety performance.

In some embodiments, the third end portion is entirely wrapped by the first bent portion.

In some embodiments, an end portion of the second electrode sheet close to the first tab along the first direction is entirely wrapped by the first separator.

In some embodiments, the second electrode sheet further includes a second tab connected to the fourth end portion. The second separator further comprises a second bent portion and a second extension portion, the second extension portion is at least partially arranged on a side of the first flat and straight portion facing away from the second separation portion, the second bent portion connects the second separation portion to the second extension portion, and the second end portion is at least partially wrapped by the second bent portion. The second bent portion and the second extension portion can separate the first flat and straight portion from the second tab when the second tab is inserted between the first flat and straight portion and the second flat and straight portion, thus reducing the risk of contact between the second tab and the first flat and straight portion and improving safety performance.

In some embodiments, the second electrode sheet further includes a second tab connected to the fourth end portion. The first flat and straight portion is arranged on both sides of the second flat and straight portion along the second direction. The first separator further comprises a third bent portion and a third extension portion, the first extension portion and the third extension portion are positioned on both sides of the first separation portion along the second direction respectively, the third extension portion is at least partially positioned on a side of the first flat and straight portion facing away from the first separation portion, the third bent portion connects the first separation portion to the third extension portion, and the second end portion is at least partially wrapped by the third bent portion. The third bent portion and the third extension portion can separate the first flat and straight portion from the second tab when the second tab is inserted between the first flat and straight portion and the second flat and straight portion, thus reducing the risk of contact between the second tab and the first flat and straight portion and improving safety performance.

In some embodiments, the second electrode sheet further comprises a second tab connected to the third end portion, and the third end portion is partially wrapped by the first bent portion. The first tab and the second tab are spaced apart from each other along a third direction perpendicular to the first direction and the second direction.

In some embodiments, the first tab includes two first edges opposite to each other along the third direction, the first bent portion includes two second edges opposite to each other along the third direction, and each of the second edges exceeds its corresponding first edge along the third direction.

In some embodiments, the second separator further comprises a second bent portion and a second extension portion, the second extension portion is at least partially arranged on a side of the first flat and straight portion facing away from the second separation portion, the second bent portion connects the second separation portion to the second extension portion, and the first end portion is at least partially wrapped by the second bent portion.

In some embodiments, the first flat and straight portion is arranged on both sides of the second flat and straight portion along the second direction. The first separator further comprises a third bent portion and a third extension portion, the first extension portion and the third extension portion are positioned on both sides of the first separation portion along the second direction respectively, the third extension portion is at least partially positioned on a side of the first flat and straight portion facing away from the first separation portion, the third bent portion connects the first separation portion to the third extension portion, and the first end portion is at least partially wrapped by the third bent portion. The third bent portion and the first bent portion are spaced apart from each other along the third direction.

In some embodiments, the first extension portion is positioned between the second separation portion and the second flat and straight portion.

In a second aspect, an embodiment of the present application provides a battery cell including: at least one electrode assembly according to the first aspect; a casing including an opening and an accommodating cavity for accommodating the electrode assembly; and an end cap for sealing the opening of the casing.

In a third aspect, an embodiment of the present application provides a battery including a box body and at least one battery cell according to the second aspect, where the battery cell is accommodated in the box body.

In a fourth aspect, an embodiment of the present application provides an electrical device configured to receive electrical energy provided from the battery according to the third aspect.

BRIEF DESCRIPTION OF THE DRAWINGS

Features, advantages, and technical effects of exemplary embodiments of the present application will be described below with reference to the drawings.

Figure 1:
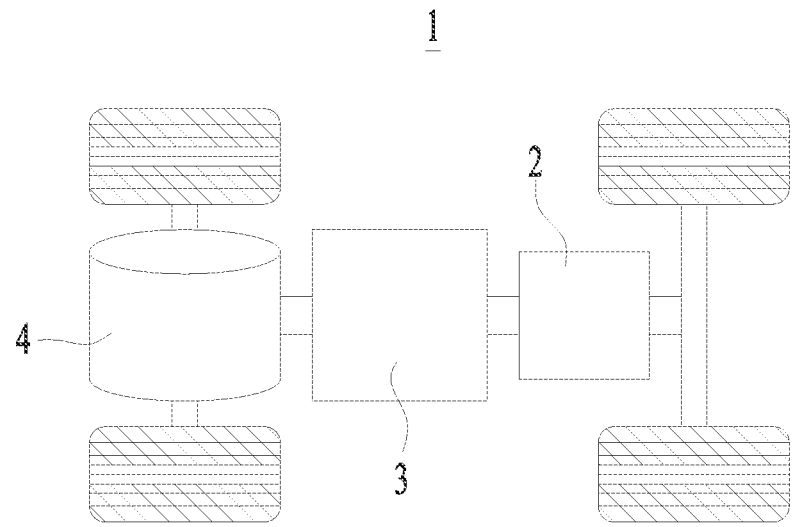
FIG. 1 is a schematic structural view of a vehicle according to an embodiment of the present application.

In the drawings, the drawings are not drawn to actual scale.

DETAILED DESCRIPTION

In order to make the objects, technical solutions and advantages of various embodiments clearer, the technical solutions of the embodiments in accordance with the present disclosure will be described clearly in conjunction with the drawings in the embodiments in accordance with the present application. Obviously, the described embodiments are a part of the embodiments in accordance with the present application, but not all of the embodiments. Based on the embodiments in the present application, all other embodiments obtained by those ordinary skilled in the art without any creative work shall fall within the protection scope of the present application.

Unless otherwise defined, all technical and scientific terms herein have the same meanings as commonly understood by those skilled in the technical field of the present application. In the present application, the terms used in the description of the present application are only for purposes of description of specific embodiments, and are not intended to limit the present application. The terms "comprising" and "having" in the description and claims of the present application and the above brief description of the drawings and any variations thereof are intended to cover non-exclusive inclusions. The terms "first", "second" and the like in the description and claims or the above brief description of the drawings of the present application are used to distinguish different objects, rather than to describe a specific order or primary and secondary relationship.

Reference to "an embodiment" in the present disclosure means that a particular feature, structure or characteristic described in connection with the embodiment may be included in at least one embodiment. Appearances of the phrase in various places in the description are not necessarily all referring to the same embodiment, nor a separate or alternative embodiment that is mutually exclusive of other embodiments. It is explicitly and implicitly understood by those skilled in the art that the embodiments described in the present application may be combined with other embodiments.

In the present disclosure, it should be noted that, unless otherwise expressly specified and limited, the terms "installed", "connected", "connection" and "attached" should be understood in a broad sense, for example, they may refer to a fixed connection, a detachable connection or an integral connection, which may be a direct connection, an indirect connection via an intermediate medium, or an internal communication between two elements. For those of ordinary skill in the art, the specific meanings of the above-mentioned terms in the present application can be understood in accordance with specific conditions.

Term "and/or" in the present disclosure is only a kind of association relationship that describes associated objects, which indicates three possible kinds of relationships. For example, A and/or B may indicate the following three cases: A exists alone, A and B exist simultaneously, and B exists alone. In addition, the character "/" in the present application generally indicates that the associated objects have an "or" relationship.

Herein, "multiple" refers to two or more (including two), similarly, "multiple groups" refers to two or more groups (including two groups), and "multiple sheets" refers to two or more sheets (including two sheets).

Herein, the term "parallel" includes not only the case of being absolutely parallel, but also the case of being approximately parallel in the conventional knowledge of engineering. Similarly, the term "perpendicular" includes not only the case of being absolutely perpendicular, but also the case of being approximately perpendicular in the conventional knowledge of engineering.

Herein, a battery cell may include a lithium ion secondary battery cell, a lithium ion primary battery cell, a lithium sulfur battery cell, a sodium lithium ion battery cell, a sodium ion battery cell, a magnesium ion battery cell, or the like, which is not limited in the embodiments of the present application. The battery cell may be in the shape of a cylinder, a flat body, a cuboid, or other shapes, which is not limited in the embodiments of the present application. Battery cells are generally categorized into three types depending on their packaging manners, including cylindrical battery cells, rectangular battery cells, and pouch battery cells, which are not limited in the embodiments of the present application.

A battery mentioned in the embodiments in accordance with the present disclosure refers to a single physical module including one or more battery cells to provide a higher voltage and a higher capacity. For example, the battery mentioned in the present application may include a battery module, a battery pack, or the like. A battery typically includes a box body for enclosing one or more battery cells. The box body can prevent liquids or other foreign objects from affecting the charging or discharging of the battery cells.

The battery cell and the battery described in various embodiments are both applicable to an electrical device. The battery cell and the battery provide electrical energy to the electrical device. For example, the electrical device may be a cell phone, a portable device, a notebook computer, a battery car, an electric vehicle, a ship, a spacecraft, an electric toy, or an electric tool. For example, the spacecraft includes an airplane, a rocket, a space shuttle, or a spaceship. The electric toy includes a stationary or mobile electric toy, such as a game console, an electric toy car, an electric toy ship or an electric toy aircraft. The electric tool includes a metal electric cutting tool, an electric grinding tool, an electric assembling tool and a railway electric tool, such as an electric drill, an electric grinder, an electric wrench, an electric screwdriver, an electric hammer, an electric impact drill, a concrete vibrator or an electric planer.

It should be understood that, the battery cell and the battery described in various embodiments are not only applicable to the above-described electrical devices, but can also be applied to all devices using batteries. However, for the sake of brevity, each of the following embodiments takes an electric vehicle as an example for illustration.

FIG. 1 is a schematic structural view of a vehicle 1 according to an embodiment of the present application. As shown in FIG. 1, the vehicle 1 may be a fuel vehicle, a gas vehicle, or a new energy vehicle. The new energy vehicle may be a pure electric vehicle, a hybrid electric vehicle, or an extended-range electric vehicle. A battery 2, a controller 3 and a motor 4 may be arranged inside the vehicle 1. The controller 3 is configured to control the battery 2 to supply power to the motor 4. For example, the battery 2 may be arranged at the bottom, the front or the rear of the vehicle 1. The battery 2 may be used for supplying power to the vehicle 1. For example, the battery 2 may be used for a circuit system of the vehicle 1 as a supply for operation power of the vehicle 1. For example, the battery 2 may be used for the power requirements in the starting, navigating and running of the vehicle 1. In another embodiment of the present application, the battery 2 may not only be used as the supply for operation power of the vehicle 1, but may also be used as a supply for driving power of the vehicle 1 to provide driving power for the vehicle 1 instead of or partially instead of fuel or natural gas.

In order to meet different power requirements, the battery 2 may include a plurality of battery cells. The plurality of battery cells may be connected in series or in parallel or in series-parallel. A series-parallel connection refers to a combination of serial and parallel connections. The battery 2 may also be referred to as a battery pack. Optionally, the plurality of battery cells may be connected in series or in parallel or in series-parallel to form a battery module, and then a plurality of battery modules may be connected in series or in parallel or in series-parallel to form the battery 2. That is to say, the battery 2 may be directly formed by a plurality of battery cells, or the battery 2 may be formed by battery modules each formed by a plurality of battery cells.

Figure 2:
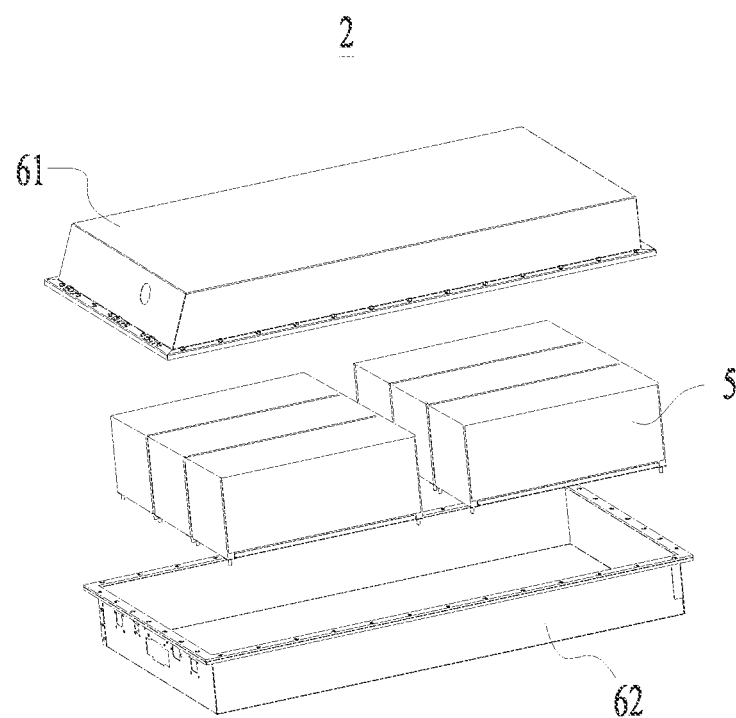
FIG. 2 is a schematic structural view of a battery according to an embodiment of the present application.

FIG. 2 is a schematic structural view of a battery 2 according to an embodiment of the present application. As shown in FIG. 2, the battery 2 may include a plurality of battery cells 5. The battery 2 may further include a box body (or a cover body). The inside of the box body is a hollow structure, and the plurality of battery cells 5 are accommodated in the box body. As shown in FIG. 2, the box body may include two portions referred to as a first box body portion 61 and a second box body portion 62 respectively. The first box body portion 61 and the second box body portion 62 are fastened together. The shapes of the first box body portion 61 and the second box body portion 62 may be determined depending on the combined shape of the plurality of battery cells 5. Each of the first box body portion 61 and the second box body portion 62 may have an opening. For example, the first box body portion 61 and the second box body portion 62 may each be a hollow cuboid with only one surface being an open surface. The opening of the first box body portion 61 and the opening of the second box body portion 62 are arranged opposite to each other. The first box body portion 61 and the second box body portion 62 are fastened together to form a box body with a closed cavity. The plurality of battery cells 5 are connected in parallel or in series or in series-parallel with one another and then placed in the box body formed by the first box body portion 61 and the second box body portion 62 being fastened together.

In some embodiments, the battery 2 may also include other structures, which will not be detailed here. For example, the battery 2 may further include a bus component, which is configured to realize electrical connection between the plurality of battery cells 5, such as a parallel connection or a serial connection or a serial-parallel connection. Specifically, the bus component may realize electrical connection between the battery cells 5 by connecting electrode terminals of the battery cells 5. Further, the bus component may be fixed to the electrode terminals of the battery cells 5 by welding. Furthermore, the electrical energy of the plurality of battery cells 5 may be drawn out outside the box body via an electrically conductive mechanism. In some embodiments, the electrically conductive mechanism may be part of the bus component.

Figure 3:
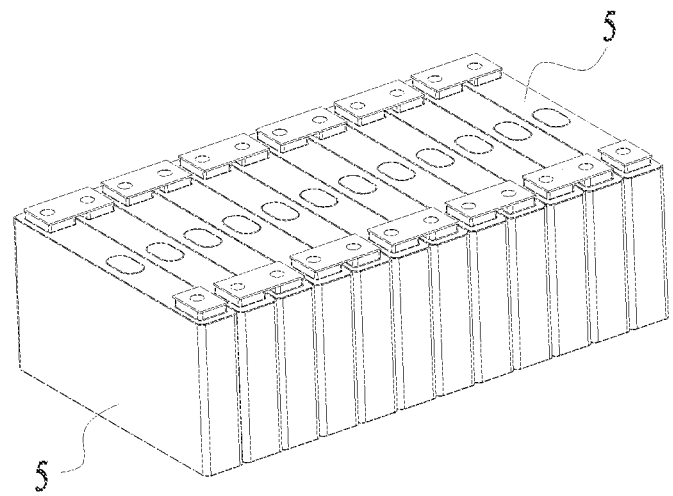
FIG. 3 is a schematic view of a battery module according to an embodiment of the present application.

Depending on different power requirements, the number of battery cells 5 may be set to any value. Larger capacity or power can be achieved by connecting the plurality of battery cells 5 in series, in parallel or in series-parallel. Since a great number of battery cells 5 may included in each battery 2, in order to facilitate installation, the battery cells 5 may be arranged in groups, where each group of battery cells 5 constitutes a battery module. The number of battery cells 5 included in the battery module is not limited, and can be set according to requirements. For example, FIG. 3 is an example of a battery module. The battery 2 may include a plurality of battery modules that may be connected in series, in parallel or in series-parallel.

Figure 4:
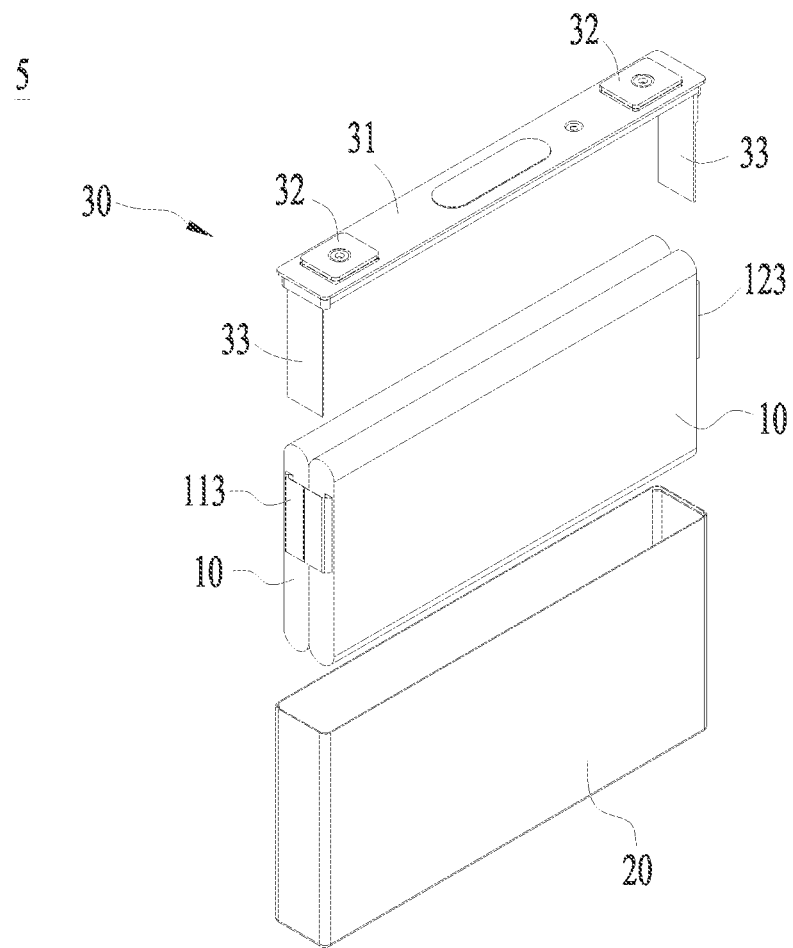
FIG. 4 is a schematic structural view of a battery cell according to an embodiment of the present application.

FIG. 4 is a schematic structural view of a battery cell 5 according to an embodiment of the present application. As shown in FIG. 4, the battery cell 5 of an embodiment of the present application includes an electrode assembly 10, a casing 20 and an end cap assembly 30. The casing 20 includes an accommodating cavity and an opening. The electrode assembly 10 is accommodated in the accommodating cavity. The shaped of the casing 20 is defined depending on the combined shape of one or more electrode assemblies 10. For example, the casing 20 may be a hollow cuboid, a hollow cube or a hollow cylinder with one surface including an opening to facilitate the arrangement of the one or more electrode assemblies 10 within the casing 20. For example, when the casing 20 is a hollow cuboid or cube, one of the side surfaces of the casing 20 is an open surface, that is, the side surface does not include a wall structure so that the inside and the outside of the casing 20 communicate with each other. The end cap assembly 30 includes an end cap 31 covering the opening and connected with the casing 20, thereby sealing the opening of the casing 20, so that the electrode assembly 10 is placed within the closed cavity. The casing 20 is filled with an electrolyte, such as an electrolytic solution.

The end cap assembly 30 may further include two electrode terminals 32 that may be arranged on the end cap 31. The end cap 31 is generally in a shape of a flat plate, where the two electrode terminals 32 are fixed on the flat surface of the end cap 31, and the two electrode terminals 32 are a positive electrode terminal and a negative electrode terminal respectively. Each electrode terminal 32 is correspondingly provided with one connecting member 33 (which may also be called a current collecting member), which is configured for electrically connecting the electrode assembly 10 to the electrode terminal 32.

The electrode assembly 10 is composed of a positive electrode sheet, a negative electrode sheet and a separator. The operation of the battery cell 5 mainly relies on a movement of metal ions between the positive electrode sheet and the negative electrode sheet. The positive electrode sheet includes a positive electrode current collector and a positive electrode active material layer. The positive electrode active material layer is coated on the surface of the positive electrode current collector. The current collector without the positive electrode active material layer coated thereon protrudes from the current collector with the positive electrode active material layer coated thereon, and the current collector without the positive electrode active material layer coated thereon is used as a positive tab. Taking a lithium ion battery as an example, a material of the positive electrode current collector may be aluminum. The positive electrode active material may be lithium cobaltate, lithium iron phosphate, ternary lithium, lithium manganate, or the like. The negative electrode sheet includes a negative electrode current collector and a negative electrode active material layer. The negative electrode active material layer is coated on the surface of the negative electrode current collector. The current collector without the negative electrode active material layer coated thereon protrudes from the current collector with the negative electrode active material layer coated thereon, and the current collector with the negative electrode active material layer coated thereon is used as a negative tab. The material of the negative electrode current collector may be copper, and the negative electrode active material may be carbon or silicon. In order to ensure that no fusing occurs when a large current passed through, the number of positive tabs is multiple and these positive tabs are stacked, and the number of negative tabs is multiple and these negative tabs are stacked. The separator has a large number of through vias, which can ensure the free passage of electrolyte ions and have good permeability to lithium ions. The material of the separator may be PP, PE, or the like. The development of battery technology needs to consider many design factors at the same time, such as energy density, cycle life, discharge capacity, charge-discharge rate and other performance parameters. In addition, the safety of the battery also needs to be considered.

In some examples, a plurality of positive tabs are stacked and connected to one connecting member 33, and then electrically connected to one electrode terminal 32 via the connecting member 33. The plurality of negative tabs are stacked and connected to another connecting member 33, and then electrically connected to another electrode terminal 32 via another connecting member 33.

Figure 5:
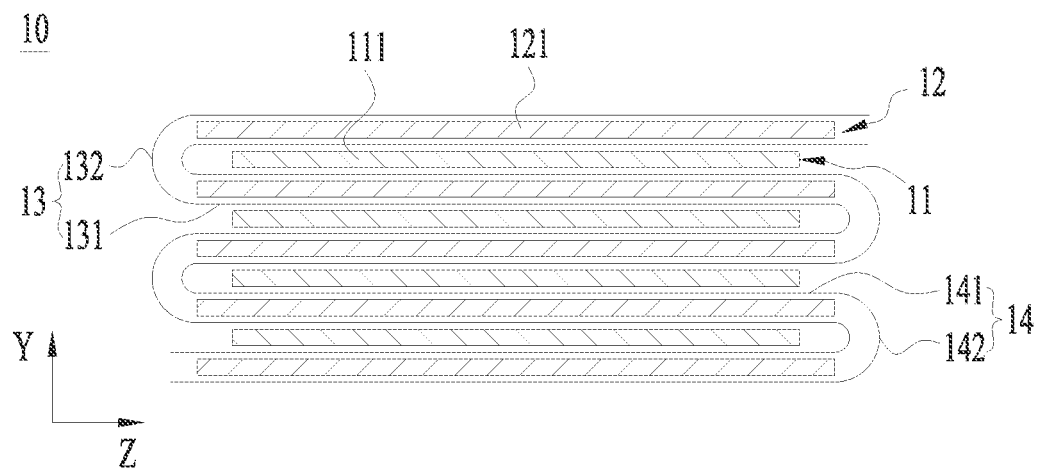
FIG. 5 is a schematic cross-sectional view of an electrode assembly according to an embodiment of the present application.

FIG. 5 is a schematic cross-sectional view of an electrode assembly 10 according to an embodiment of the present application. As shown in FIG. 5, the electrode assembly 10 includes at least one first electrode sheet 11 and at least one second electrode sheet 12. Polarities of the first electrode sheet 11 and the second electrode sheet 12 are opposite. When the first electrode sheet 11 is a negative electrode sheet, the second electrode sheet 12 is a positive electrode sheet. When the first electrode sheet 11 is a positive electrode sheet, the second electrode sheet 12 is a negative electrode sheet.

In some embodiments, the electrode assembly 10 includes a plurality of first electrode sheets 11 and a plurality of second electrode sheets 12, and the plurality of first electrode sheets 11 and the plurality of second electrode sheets 12 are alternately stacked. The direction in which the first electrode sheet 11 and the second electrode sheet 12 are stacked is parallel to a thickness direction of the first electrode sheet 11 and a thickness direction of the second electrode sheet 12.

Each first electrode sheet 11 includes a first flat and straight portion 111 and a first tab connected to the first flat and straight portion 111. The first flat and straight portion 111 is substantially in a shape of flat plate and perpendicular to the stacking direction. Each second electrode sheet 12 includes a second flat and straight portion 121 and a second tab connected to the second flat and straight portion 121. The second flat and straight portion 121 is substantially in a shape of flat plate and perpendicular to the stacking direction. The first flat and straight portion 111 is parallel to the second flat and straight portion 121. The first flat and straight portion 111 and the second flat and straight portion 121 are alternately stacked in the stacking direction.

In some embodiments, the first electrode sheet 11 is a positive electrode sheet, and the second electrode sheet 12 is a negative electrode sheet. The first flat and straight portion 111 includes a positive electrode active material layer and a current collector with the positive electrode active material layer coated thereon, and the first tab is a positive tab. The second flat and straight portion 121 includes a negative electrode active material layer and a current collector with the negative electrode active material layer coated thereon, and the second tab is a negative tab.

The electrode assembly 10 includes a first separator 13 and a second separator 14 for separating the first electrode sheet 11 from the second electrode sheet 12. In some examples, the first separator 13 is bent in a zigzag reciprocating manner and includes a plurality of first separation portions 131 and a plurality of first transition portions 132. The plurality of first separation portions 131 are stacked along the stacking direction. Each first transition portion 132 connects two adjacent first separation portions 131, and each first transition portion 132 is at least partially bent into an arc shape. The second separator 14 is bent in a zigzag reciprocating manner and includes a plurality of second separation portions 141 and a plurality of second transition portions 142. The plurality of second separation portions 141 are stacked along the stacking direction. Each second transition portion 142 connects two adjacent second separation portions 141, and each second transition portion 142 is at least partially bent into an arc shape. The first separation portion 131 and the second separation portion 141 are positioned on both sides of the second flat and straight portion 121 in the stacking direction respectively, and separate the first flat and straight portion 111 from the second flat and straight portion 121.

Figure 6:
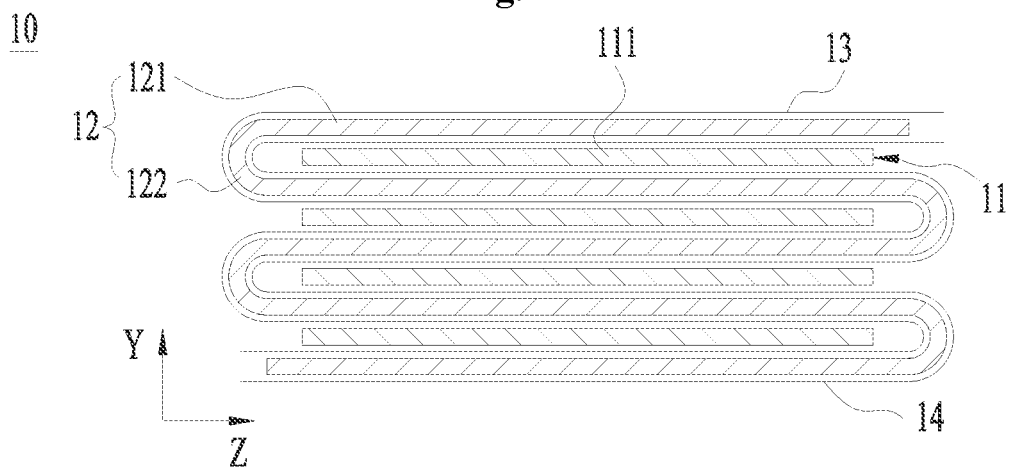
FIG. 6 is a schematic cross-sectional view of an electrode assembly according to an embodiment of the present application.

FIG. 6 is a schematic cross-sectional view of an electrode assembly 10 according to an embodiment of the present application. As shown in FIG. 6, the electrode assembly 10 of an embodiment of the present application includes a plurality of first electrode sheets 11 and one second electrode sheet 12.

In this embodiment, the second electrode sheet 12 includes a plurality of second flat and straight portions 121 and a plurality of second connection portions 122. The plurality of second flat and straight portions 121 are stacked along the stacking direction. Each second connection portion 122 connects two adjacent second flat and straight portions 121. The second connection portion 122 is at least partially bent into an arc shape. The second electrode sheet 12 is a continuous structure and is bent in a reciprocating manner, to form a plurality of second flat and straight portions 121 and a plurality of second connection portions 122. Each first electrode sheet 11 is arranged between two adjacent second flat and straight portions 121. The second electrode sheet 12 includes one or more second tabs. Optionally, the number of the second tabs and the number of the second flat and straight portions 121 are the same and are arranged in a one-to-one correspondence.

Figure 7:
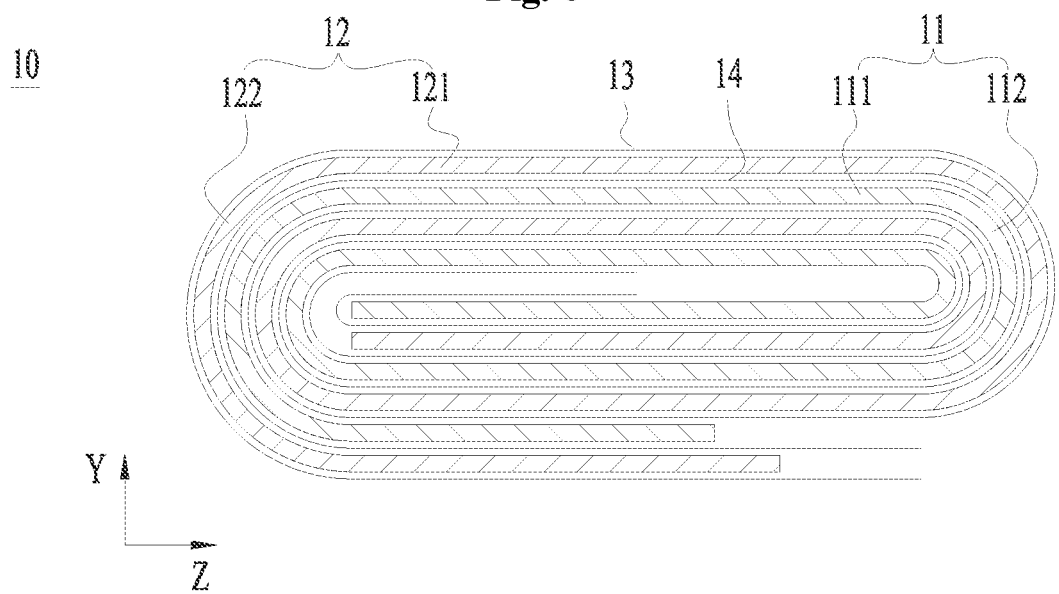
FIG. 7 is a schematic cross-sectional view of an electrode assembly according to an embodiment of the present application.

FIG. 7 is a schematic cross-sectional view of an electrode assembly 10 according to an embodiment of the present application. As shown in FIG. 7, the electrode assembly 10 of an embodiment of the present application is of a winding structure and includes a first electrode sheet 11, a second electrode sheet 12, a first separator 13 and a second separator 14. In some examples, each of the first electrode sheet 11 and the second electrode sheet 12 is a single and a continuous strip structure. The first electrode sheet 11, the first separator 13, the second electrode sheet 12 and the second separator 14 are stacked in sequence and wound two or more turns to form the electrode assembly 10, and the electrode assembly 10 is flat.

Specifically, the first electrode sheet 11 includes a plurality of first flat and straight portions 111 and a plurality of first connection portions 112. The plurality of first flat and straight portions 111 are stacked along the stacking direction. The first connection portion 112 is at least partially bent into an arc shape and connected to the first flat and straight portion 111. Optionally, each first connection portion 112 connects two first flat and straight portions 111. The second electrode sheet 12 includes a plurality of second flat and straight portions 121 and a plurality of second connection portions 122. The plurality of second flat and straight portions 121 are stacked along the stacking direction. The second connection portion 122 is at least partially bent into an arc shape and connected to the second flat and straight portion 121. Optionally, each second connection portion 122 connects two second flat and straight portions 121. The first flat and straight portion 111 and the second flat and straight portion 121 are stacked along the stacking direction.

Figure 8:
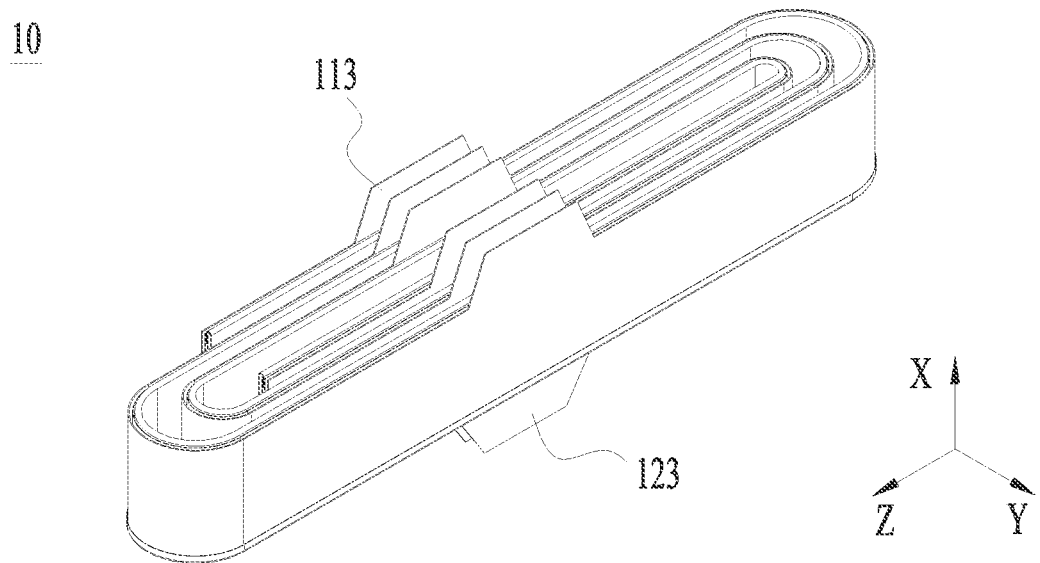
FIG. 8 is a schematic structural view of an electrode assembly according to an embodiment of the present application.
Figure 9:
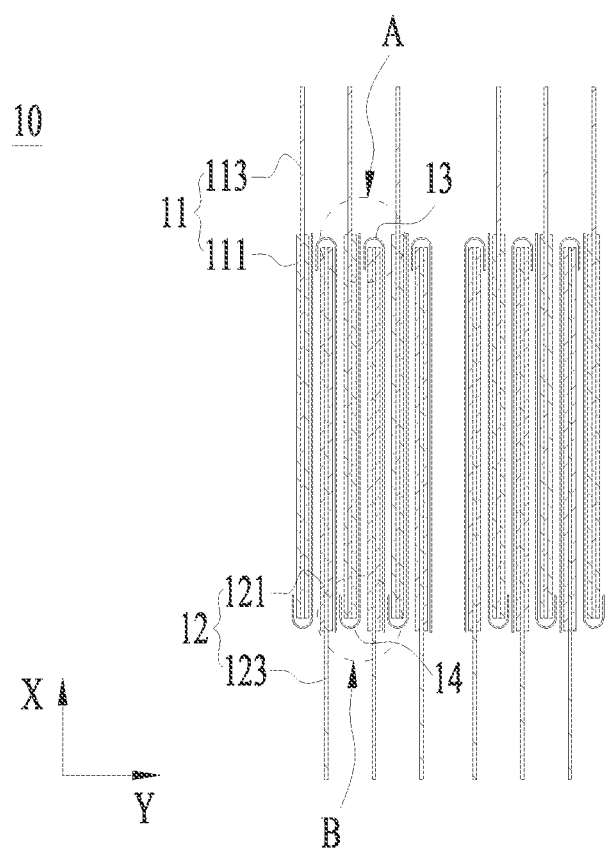
FIG. 9 is a schematic cross-sectional view of an electrode assembly according to an embodiment of the present application.
Figure 10:
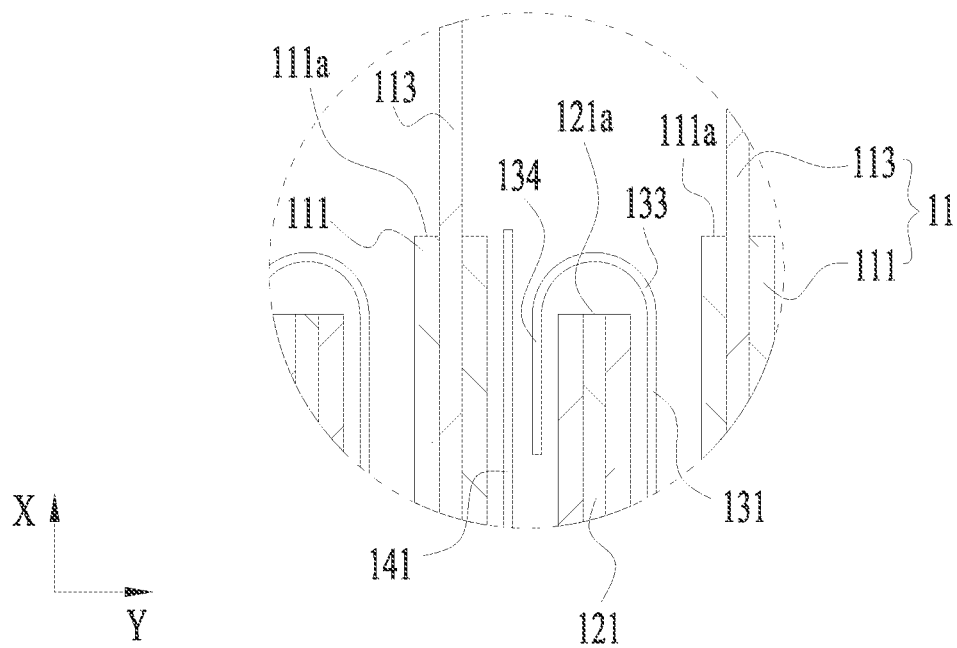
FIG. 10 is an enlarged schematic view of the round frame A of the electrode assembly shown in FIG. 9.
Figure 11:
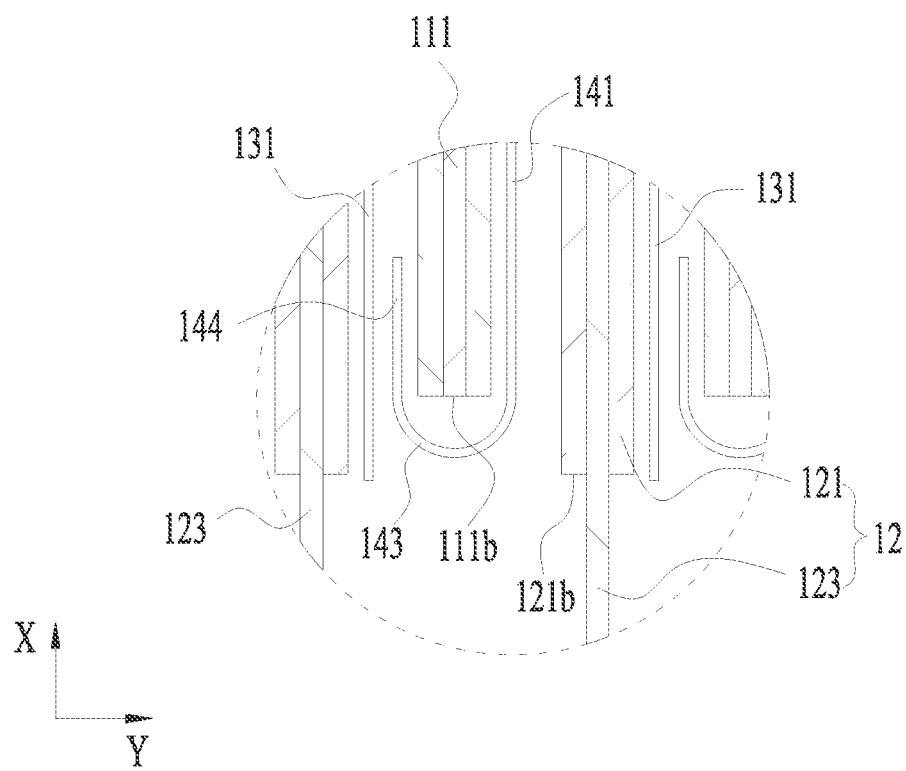
FIG. 11 is an enlarged schematic view of the round frame B of the electrode assembly shown in FIG. 9.

FIG. 8 is a schematic structural view of an electrode assembly 10 according to an embodiment of the present application. FIG. 9 is a schematic cross-sectional view of an electrode assembly 10 according to an embodiment of the present application. FIG. 10 is an enlarged schematic view of the round frame A of the electrode assembly 10 shown in FIG. 9. FIG. 11 is an enlarged schematic view of the round frame B of the electrode assembly 10 shown in FIG. 9.

As shown in FIG. 8 to FIG. 11, the first electrode sheet 11 includes a first flat and straight portion 111 and a first tab 113. The first tab 113 is connected to an end portion of the first flat and straight portion 111 along a first direction X. The first flat and straight portion 111 and the second flat and straight portion 121 are stacked along a second direction Y, that is, the stacking direction is parallel to the second direction Y. The second direction Y is perpendicular to the first direction X.

Both ends of the first flat and straight portion 111 along the first direction X include a first end portion 111a and a second end portion 111b respectively. The first tab 113 is connected to the first end portion 111a. Both ends of the second flat and straight portion 121 along the first direction X include a third end portion 121a and a fourth end portion 121b respectively. The third end portion 121a is closer to the first tab 113 than the fourth end portion 121b.

The inventor have found that, during the assembling or using of the battery cell, since the first tab is thinner, the part of the first tab connected to the first flat and straight portion may be bent, which may cause the first tab to be inserted between the first flat and straight portion and second flat and straight portion. In such case, the first tab may conduct with the second flat and straight portion, leading to the risk of short circuit.

In view of this, the inventor have improved the structure of the electrode assembly to reduce the risk of short circuit. Specifically, in the electrode assembly 10 of an embodiment of the present application, the first separator 13 further includes a first bent portion 133 and a first extension portion 134. The first extension portion 134 is at least partially arranged on a side of the second flat and straight portion 121 facing away from the first separation portion 131 and positioned between the first flat and straight portion 111 and the second flat and straight portion 121. The first bent portion 133 connects the first separation portion 131 to the first extension portion 134 and is positioned on a side close to first tab 113 of the second flat and straight portion 121 along the first direction X. The first bent portion 133 and the first extension portion 134 are configured to separate the second flat and straight portion 121 from the first tab 113 when the first tab 113 is inserted between the first flat and straight portion 111 and the second flat and straight portion 121.

In the present application, the first bent portion 133 and the first extending portion 134 may be formed by bending the first separator 13. The first bent portion 133 is at least partially arc-shaped. The first separation portion 131, the first bent portion 133 and the first extension portion 134 form a U-shaped structure, and wrap a part of the second flat and straight portion 121 close to the first tab 113.

In the electrode assembly 10 of an embodiment of the present application, the first bent portion 133 and the first extension portion 134 can separate the second flat and straight portion 121 from the first tab 113 when the first tab 113 is inserted between the first flat and straight portion 111 and the second flat and straight portion 121, thus reducing the risk of contact between the first tab 113 and the second flat and straight portion 121 and improving safety performance. The first bent portion 133 is integrally connected with the first extension portion 134, which can prevent the first tab 113 from being inserted between the first extension portion 134 and the second flat and straight portion 121 to reduce the risk of short circuit.

An end of the first extension portion 134 away from the first bent portion 133 is a free end. The free end of the first extension portion 134 is positioned between the first flat and straight portion 111 and the second flat and straight portion 121, and is spaced apart by a certain distance from the first tab 113 on the first direction X. The first flat and straight portion 111 can press the free end of the first extension portion 134 tightly against the second flat and straight portion 121. When the first tab 113 is inserted between the first flat and straight portion 111 and the second flat and straight portion 121, the risk of the free end of the first extension portion 134 being pulled away from between the first flat and straight portion 111 and the second flat and straight portion 121 under the pressing of the first tab 113 can be reduced.

In some embodiments, the third end portion 121a is partially wrapped by the first bent portion 133. When the first tab 113 is bent under pressure, the first bent portion 133 can separate the first tab 113 from the third end portion 121a, thereby reducing the risk of the first tab 113 overlapping the third end portion 121a and improving safety performance. "The third end portion 121a being partially wrapped by the first bent portion 133" refers to that the first bent portion 133 wraps at least a part of the third end portion 121a along the first direction X where the first bent portion 133 may be directly attached to the third end portion 121a or may be spaced apart from the third end portion 121a by a predetermined distance along the first direction X.

In some embodiments, along a third direction Z, the size of the first bent portion 133 along the third direction Z is greater than the size of the first tab 113 along the third direction Z. The third direction Z is perpendicular to the first direction X and the second direction Y.

In some embodiments, the third end portion 121a is entirely wrapped by the first bent portion 133. The first bent portion 133 can separate the first tab 113 from the third end portion 121a, thereby reducing the risk of the first tab 113 overlapping the third end portion 121a and improving safety performance.

In some embodiments, an end portion of the second electrode sheet 12 close to the first tab 113 along the first direction X is entirely wrapped by the first separator 13. For the second electrode sheet 12 including a plurality of second flat and straight portions 121 and a plurality of second connection portions 122, the first separator 13 not only wraps the end portion (i.e., the third end portion 121a) of the second flat and straight portion 121 close to the first tab 113 along the first direction X, but also wraps the end portion of the second connection portion 122 close to the first tab 113 along the first direction X. As such, the first separator 13 can be consecutively bent and wrap the end portion of the second electrode sheet 12 close to the first tab 113 along the first direction X.

In some embodiments, the first extension portion 134 is positioned between the second separation portion 141 and the second flat and straight portion 121. In the process of assembling the electrode assembly 10, the first separator 13 and the second electrode sheet 12 may be assembled together first, and then assembled with the first electrode sheet 11 and the second separator 14.

The smaller the size of the first extension portion 134 along the first direction X, the more likely it is for the first extension portion 134 to escape from between the first flat and straight portion 111 and the second flat and straight portion 121, and at the same time, the more likely it is for the part of the first tab 113 inserted between the first flat and straight portion 111 and the second flat and straight portion 121 to exceed the free end of the first extension portion 134. The larger the size of the first extension portion 134 along the first direction X, the larger space the first extension portion 134 occupies, the more serious the impact on the transport efficiency of lithium ions. With comprehensive consideration, the inventor believes that the ratio of the size of the first extension portion 134 to the size of the second flat and straight portion 121 is 0.01 to 0.3 along the first direction X.

In some embodiments, the second tab 123 is connected to the fourth end portion 121b. At this time, the first tab 113 and the second tab 123 extend outside from both sides of the electrode assembly 10 along the first direction X. The inventor has found that, the second tab 123 also has a risk of being inserted between the first flat and straight portion 111 and the second flat and straight portion 121. In view of this, in some embodiments, the second separator 14 further includes a second bent portion 143 and a second extension portion 144. The second extension portion 144 is at least partially arranged on a side of the first flat and straight portion 111 facing away from the second separation portion 141. The second bent portion 143 connects the second separation portion 141 to the second extension portion 144, and the second end portion 111b is at least partially wrapped by the second bent portion 143. The second separation portion 141, the second bent portion 143 and the second extension portion 144 form a U-shaped structure and wrap a part of the first flat and straight portion 111 close to the second tab 123. Optionally, the second end portion 111b is entirely wrapped by the second bent portion 143.

The second bent portion 143 and the second extension portion 144 can separate the first flat and straight portion 111 from the second tab 123 when the second tab 123 is inserted between the first flat and straight portion 111 and the second flat and straight portion 121, thus reducing the risk of contact between the first tab 113 and the second flat and straight portion 121 and improving the safety performance. The second bent portion 143 is integrally connected with the second extension portion 144, which can prevent the second tab 123 from being inserted between the second extension portion 144 and the first flat and straight portion 111 to reduce the risk of short circuit.

Figure 12:
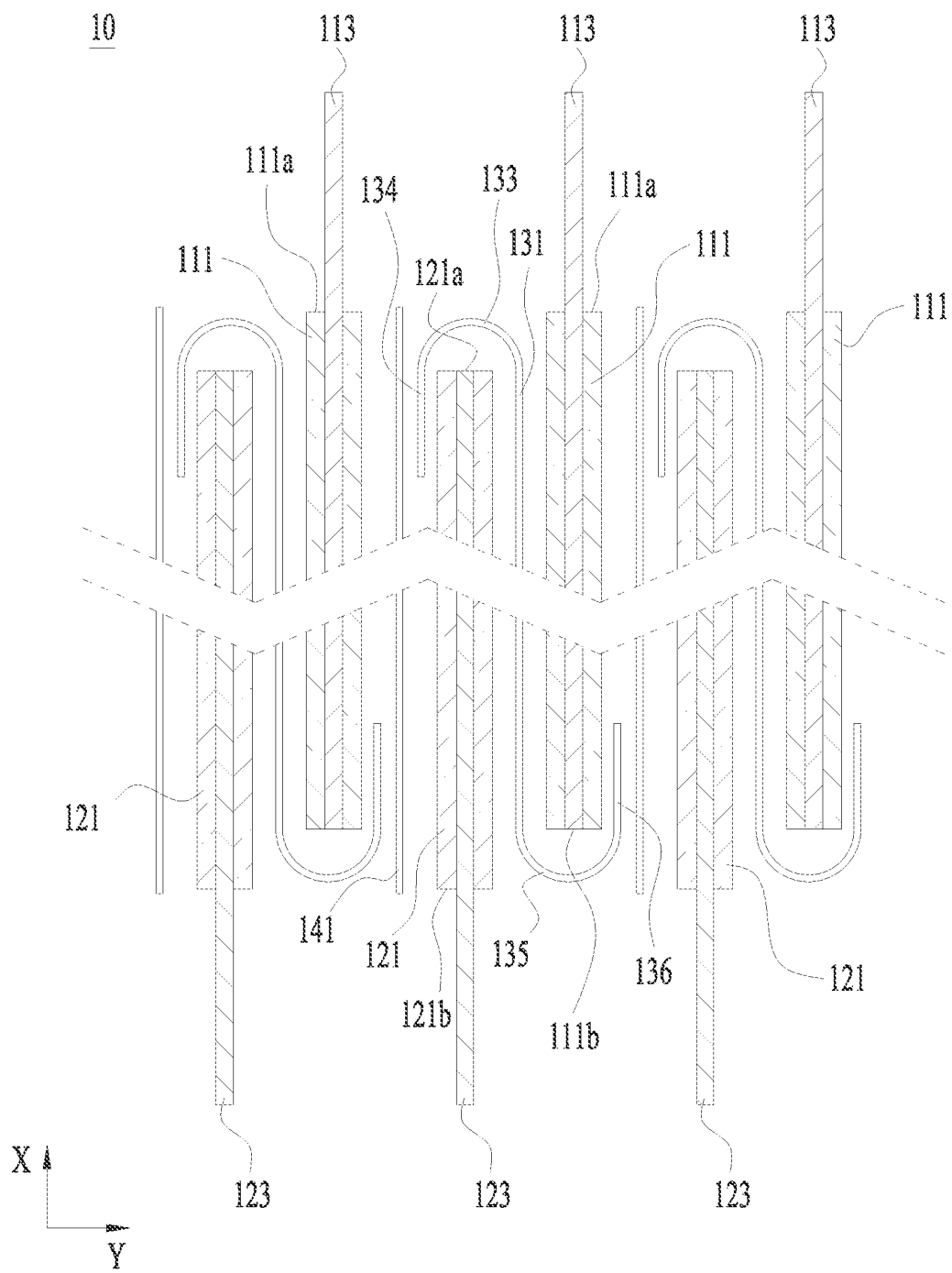
FIG. 12 is a schematic cross-sectional view of an electrode assembly according to an embodiment of the present application.

FIG. 12 is a schematic cross-sectional view of an electrode assembly 10 according to an embodiment of the present application.

As shown in FIG. 12, in some embodiments, the first flat and straight portion 111 is arranged on both sides of the at least one second flat and straight portion 121 along the second direction Y.

The first separator 13 further includes a third bent portion 135 and a third extension portion 136. The first extension portion 134 and the third extension portion 136 are positioned on both sides of the first separation portion 131 along the second direction Y, respectively. The third extension portion 136 is at least partially positioned on a side of the first flat and straight portion 111 facing away from the first separation portion 131. The third bent portion 135 connects the first separation portion 131 to the third extension portion 136, and the second end portion 111b is at least partially wrapped by the third bent portion 135. The first separation portion 131, the first bent portion 133, the first extension portion 134, the third bent portion 135 and the third extension portion 136 form an S-shaped structure. Optionally, the second end portion 111b is entirely wrapped by the third bent portion 135.

The third bent portion 135 and the third extension portion 136 can separate the first flat and straight portion 111 from the second tab 123 when the second tab 123 is inserted between the first flat and straight portion 111 and the second flat and straight portion 121, thus reducing the risk of contact between the second tab 123 and the first flat and straight portion 111 and improving the safety performance. The third bent portion 135 is integrally connected with the third extension portion 136, which can prevent the second tab 123 from being inserted between the third extension portion 136 and the first flat and straight portion 111 to reduce the risk of short circuit.

Figure 13:
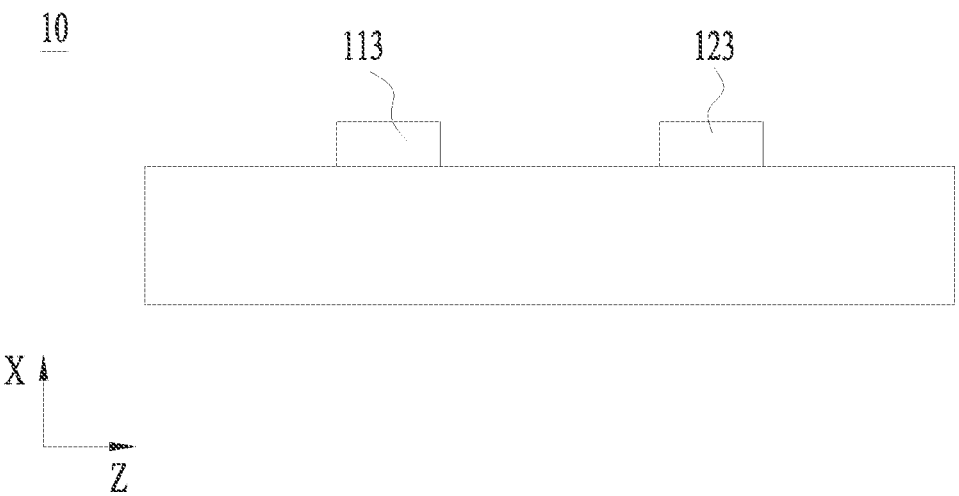
FIG. 13 is a schematic front view of an electrode assembly according to an embodiment of the present application.
Figure 14:
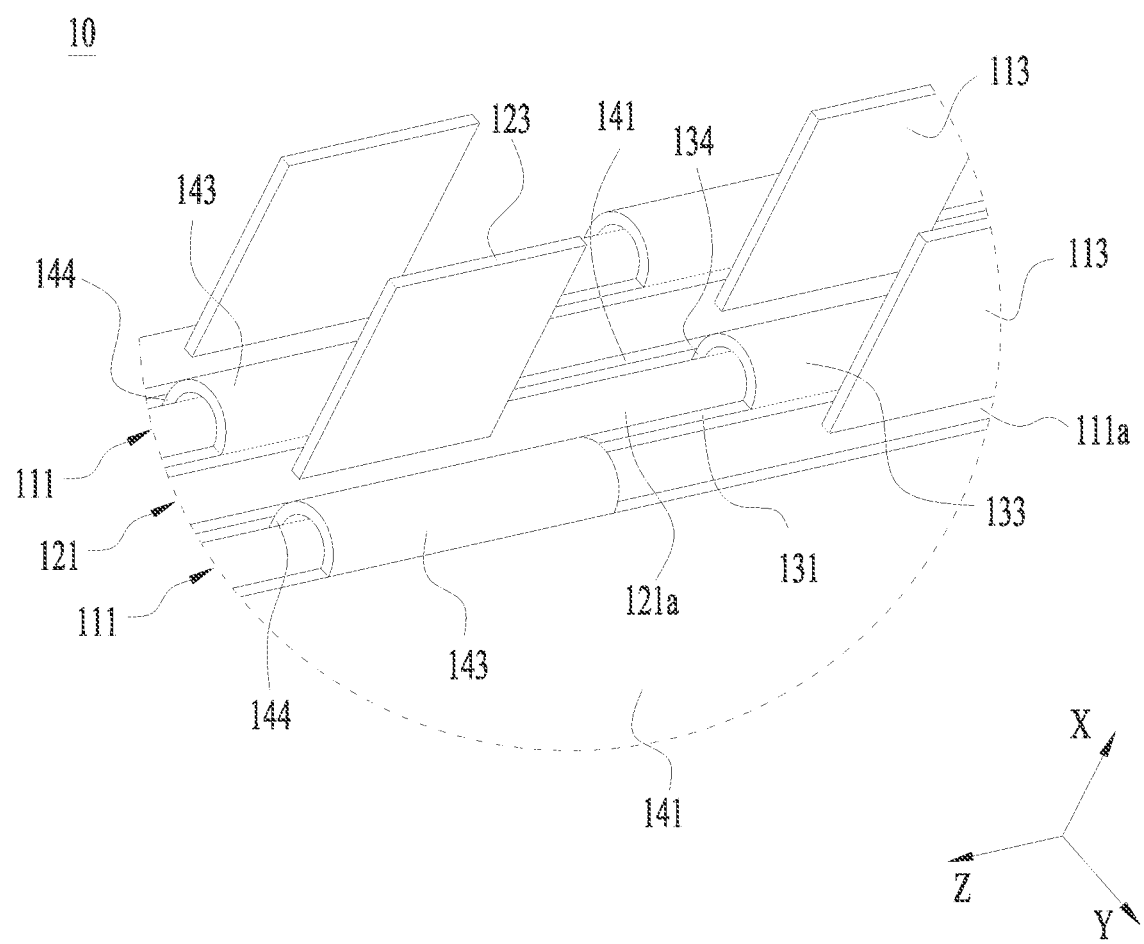
FIG. 14 is a schematic partial structural view of an electrode assembly according to an embodiment of the present application.

FIG. 13 is a schematic front view of an electrode assembly 10 according to an embodiment of the present application. FIG. 14 is a schematic partial structural view of an electrode assembly 10 according to an embodiment of the present application.

As shown in FIG. 13 and FIG. 14, in some embodiments, the second tab 123 is connected to the third end portion 121a. Along the first direction X, the first tab 113 and the second tab 123 extend outside from a same side of the electrode assembly 10. Along the third direction Z, the first tab 113 and the second tab 123 are spaced apart from each other, where the third direction Z is perpendicular to the first direction X and the second direction Y.

The third end portion 121a is partially wrapped by the first bent portion 133. The second tab 123 is connected to a part of the third end portion 121a not wrapped by the first bent portion 133. Optionally, along the third direction Z, the second tab 123 and the first bent portion 133 are spaced apart from each other.

In some embodiments, the first tab 113 includes two first edges arranged opposite to each other along the third direction Z, the first bent portion 133 includes two second edges arranged opposite to each other along the third direction Z, and each second edge exceeds its corresponding first edge along the third direction Z. The size of the first bent portion 133 along the third direction Z is greater than the size of the first tab 113 along the third direction Z. When the first tab 113 is bent, the first bent portion 133 can separate the first tab 113 from the third end portion 121a, so as to reduce the risk of the first tab 113 overlapping the third end portion 121a.

In some embodiments, the size of the first extension portion 134 along the third direction Z is the same as the size of the first bent portion 133 along the third direction Z. Specifically, two third edges of the first extension portion 134 are arranged opposite to each other along the third direction Z. The third edge is flush with its corresponding first edge along the third direction Z.

In some embodiments, the second separator 14 further includes a second bent portion 143 and a second extension portion 144. The second extension portion 144 is at least partially arranged on a side of the first flat and straight portion 111 facing away from the second separation portion 141. The second bent portion 143 connects the second separation portion 141 to the second extension portion 144, and the first end portion 111a is partially wrapped by the second bent portion 143. The second bent portion 143 and the second extension portion 144 can separate the first flat and straight portion 111 from the second tab 123 when the second tab 123 is inserted between the first flat and straight portion 111 and the second flat and straight portion 121, thus reducing the risk of contact between the second tab 123 and the first flat and straight portion 111 and improving the safety performance. The second bent portion 143 is integrally connected with the second extension portion 144, which can prevent the second tab 123 from being inserted between the second extension portion 144 and the first flat and straight portion 111 to reduce the risk of short circuit.

In some embodiments, the second tab 123 includes two fourth edges arranged opposite to each other along the third direction Z. The second bent portion 143 includes two fifth edges arranged opposite to each other along the third direction Z. Each fifth edge exceeds its corresponding fourth edge along the third direction Z. Optionally, the size of the second extension portion 144 along the third direction Z is the same as the size of the second bent portion 143 along the third direction Z.

Figure 15:
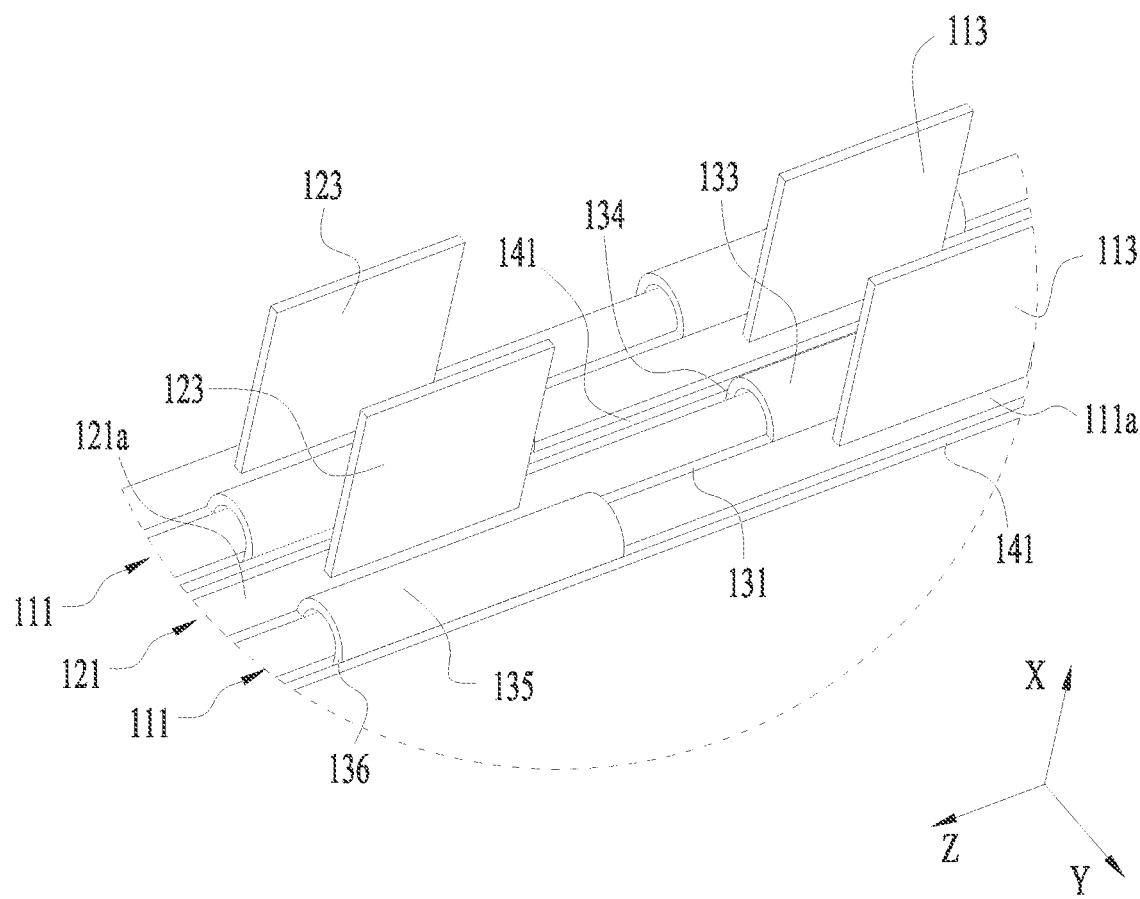
FIG. 15 is a schematic partial structural view of an electrode assembly according to an embodiment of the present application.
Figure 16:
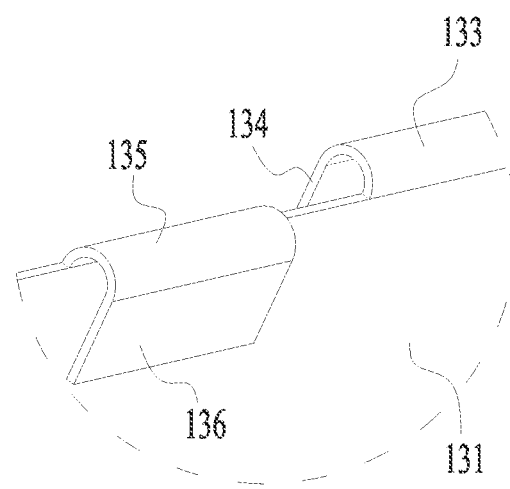
FIG. 16 is a schematic partial structural view of a first separator of an electrode assembly according to an embodiment of the present application.

FIG. 15 is a schematic partial structural view of an electrode assembly 10 according to an embodiment of the present application. FIG. 16 is a schematic partial structural view of a first separator 13 of an electrode assembly 10 according to an embodiment of the present application.

As shown in FIG. 15 and FIG. 16, the first flat and straight portion 111 is arranged on both sides of at least one second flat and straight portion 121 along the second direction Y.

The first separator 13 further includes a third bent portion 135 and a third extension portion 136. The first extension portion 134 and the third extension portion 136 are positioned on both sides of the first separation portion 131 along the second direction Y, respectively. The third extension portion 136 is at least partially positioned on a side of the first flat and straight portion 111 facing away from the first separation portion 131. The third bent portion 135 connects the first separation portion 131 to the third extension portion 136, and the first end portion 111a is at least partially wrapped by the third bent portion 135. Along the third direction Z, the third bent portion 135 and the first bent portion 133 are spaced apart from each other.

The third bent portion 135 and the third extension portion 136 can separate the first flat and straight portion 111 from the second tab 123 when the second tab 123 is inserted between the first flat and straight portion 111 and the second flat and straight portion 121, thus reducing the risk of contact between the second tab 123 and the first flat and straight portion 111 and improving the safety performance. The third bent portion 135 is integrally connected with the third extension portion 136, which can prevent the second tab 123 from being inserted between the third extension portion 136 and the first flat and straight portion 111 to reduce the risk of short circuit.

In some embodiments, the second tab 123 includes two fourth edges arranged opposite to each other along the third direction Z. The third bent portion 135 includes two sixth edges arranged opposite to each other along the third direction Z. Each sixth edge exceeds its corresponding fourth edge along the third direction Z. Optionally, the size of the third extension portion 136 along the third direction Z is the same as the size of the third bent portion 135 along the third direction Z.

What is claimed is:

1. An electrode assembly, comprising:
   at least one first electrode sheet comprising a first flat and straight portion and a first tab connected to an end portion of the first flat and straight portion along a first direction;
   at least one second electrode sheet opposite in polarity to the first electrode sheet, and comprising a second flat and straight portion and a second tab connected to the second flat and straight portion, the first flat and straight portion and the second flat and straight portion being stacked along a second direction perpendicular to the first direction;
   a first separator sheet and a second separator sheet for separating the first electrode sheet from the second electrode sheet, the first separator sheet comprising a first separation portion, a first bent portion and a first extension portion, and the second separator sheet comprising a second separation portion, a second bent portion, and a second extension portion, wherein
   the first separation portion and the second separation portion are positioned on both sides of the second flat and straight portion along the second direction respectively, and separate the first flat and straight portion from the second flat and straight portion,
   the first extension portion is at least partially arranged on a side of the second flat and straight portion facing away from the first separation portion, and is positioned between the first flat and straight portion and the second flat and straight portion, the first extension portion has a free end positioned between the first and second flat and straight portions and configured to be pressed against the second flat and straight portion by the first flat and straight portion,
   the first bent portion connects the first separation portion to the first extension portion, and is positioned on a side of the second flat and straight portion close to the first tab along the first direction, and
   the first bent portion and the first extension portion are configured to separate the second flat and straight portion from the first tab when the first tab is inserted between the first flat and straight portion and the second flat and straight portion,
   the second extension portion is at least partially arranged on a side of the first flat and straight portion facing away from the second separation portion, the second bent portion is connecting the second separation portion to the second extension portion,
   both ends of the first flat and straight portion along the first direction include a first end portion and a second end portion respectively, the first end portion is partially wrapped by the second bent portion, the first tab is connected to a part of the first portion not wrapped by the second bent portion;
   both ends of the second flat and straight portion along the first direction include a third end portion and a fourth end portion respectively, the third end portion is closer to the first tab than the fourth end portion, the third end portion is partially wrapped by the first bent portion, the second tab is connected to a part of the third portion not wrapped by the first bent portion;
   the first tab and the second tab are spaced apart from each other along a third direction perpendicular to the first direction and the second direction.

2. The electrode assembly according to claim 1, wherein the first flat and straight portion is arranged on both sides of the second flat and straight portion along the second direction;
   the first separator further comprises a third bent portion and a third extension portion, the first extension portion and the third extension portion being positioned on both sides of the first separation portion along the second direction respectively, the third extension portion being at least partially positioned on a side of the first flat and straight portion facing away from the first separation portion, the third bent portion connecting the first separation portion to the third extension portion, and the second end portion being at least partially wrapped by the third bent portion.

3. The electrode assembly according to claim 1, wherein the first tab includes two first edges opposite to each other along the third direction, the first bent portion includes two second edges opposite to each other along the third direction, and each of the second edges exceeds its corresponding first edge along the third direction.

4. The electrode assembly according to claim 1, wherein the first flat and straight portion is arranged on both sides of the second flat and straight portion along the second direction; and
   the first separator sheet further comprises a third bent portion and a third extension portion, the first extension portion and the third extension portion being positioned on both sides of the first separation portion along the second direction respectively, the third extension portion being at least partially positioned on a side of the first flat and straight portion facing away from the first separation portion, the third bent portion connecting the first separation portion to the third extension portion, and the first end portion being at least partially wrapped by the third bent portion; and, wherein the third bent portion and the first bent portion are spaced apart from each other along the third direction.

5. The electrode assembly according to claim 1, wherein the first extension portion is positioned between the second separation portion and the second flat and straight portion.

6. A battery cell, comprising:
at least one electrode assembly according to claim 1;
a casing including an opening and an accommodating cavity for accommodating the electrode assembly;
an end cap for sealing the opening of the casing.

7. A battery, comprising a box body and at least one battery cell according to claim 6, wherein the battery cell is accommodated in the box body.

8. An electrical device, configured to receive electric energy provided from the battery according to claim 7.

9. The electrode assembly according to claim 1, wherein the at least one first electrode sheet and the at least one second electrode sheet are each a single and a continuous strip structure, the at least one first electrode sheet, the first separator sheet, the at least one second electrode sheet, and the second separator are stacked in sequence in the second direction and wound in the third direction two or more turns to form the electrode assembly.

10. The electrode assembly according to claim 1, wherein the first separation portion, the first bent portion, and the first extension portion form a U-shaped structure that wraps a part of the second flat and straight portion located closer to the first tab along the first direction.

11. The electrode assembly according to claim 1, wherein a ratio of a size of the first extension portion to a corresponding size of the second flat and straight portion along the first direction is 0.01-0.3.

12. The electrode assembly according to claim 1, wherein along the third direction, a size of the first bent portion exceeds a size of the first tab.

13. An electrode assembly, comprising:
a plurality of first electrode sheets each comprising a first flat and straight portion and a first tab connected to an end portion of the first flat and straight portion along a first direction;
a plurality of second electrode sheets opposite in polarity to the first electrode sheets, each comprising a second flat and straight portion and a second tab connected to the second flat and straight portion; the first flat and straight portions and the second flat and straight portions being alternately stacked along a stacking direction that is parallel to respective thickness directions of the first and second electrode sheets, the first flat and straight portion and the second flat and straight portion being perpendicular to the stacking direction and parallel to each other;
a first separator bent in a zigzag reciprocating manner and including a plurality of first separation portions stacked along the stacking direction and a plurality of first transition portions each connecting two adjacent first separation portions, each first transition portion being at least partially bent into an arc shape; and
a second separator bent in a zigzag reciprocating manner and including a plurality of second separation portions stacked along the stacking direction and a plurality of second transition portions each connecting two adjacent second separation portions, each second transition portion being at least partially bent into an arc shape;
wherein the first separation portions and the second separation portions are positioned on both sides of the second flat and straight portion along the stacking direction respectively, and separate the first flat and straight portion from the second flat and straight portion;
wherein, along the first direction, a third end portion of the second flat and straight portion that is closer to the first tab is at least partially wrapped by one of the first transition portions, and a first end portion of the first flat and straight portion is at least partially wrapped by one of the second transition portions;
wherein the first tab is connected to a part of the first end portion not wrapped by the corresponding second transition portion, and the second tab is connected to a part of the third end portion not wrapped by the corresponding first transition portion;
wherein the first tab and the second tab are spaced apart from each other along a third direction perpendicular to the first direction and the stacking direction; and
wherein at least one of the first transition portions positioned on a side of the second flat and straight portion close to the first tab, together with an adjacent first separation portion, is configured to separate the second flat and straight portion from the first tab when the first tab is inserted between the first and second flat and straight portions, and at least one of the second transition portions positioned on a side of the first flat and straight portion close to the second tab, together with an adjacent second separation portion, is configured to separate the first flat and straight portion from the second tab when the second tab is inserted between the first and second flat and straight portions.

14. An electrode assembly, comprising:
a plurality of first electrode sheets each comprising a first flat and straight portion and a first tab connected to an end portion of the first flat and straight portion along a first direction;
one second electrode sheet opposite in polarity to the first electrode sheets, the second electrode sheet being a continuous structure bent in a reciprocating manner and comprising a plurality of second flat and straight portions and a plurality of second connection portions, the plurality of second flat and straight portions being stacked along a stacking direction, each second connection portion connecting two adjacent second flat and straight portions and being at least partially bent into an arc shape;
a first separator sheet and a second separator sheet for separating the first electrode sheets from the second electrode sheet, the first separator sheet comprising a first separation portion, a first bent portion, and a first extension portion, and the second separator sheet comprising a second separation portion, a second bent portion, and a second extension portion;
wherein the first flat and straight portions and the second flat and straight portions are perpendicular to the stacking direction and parallel to each other, and are alternately stacked along the stacking direction with each first electrode sheet arranged between two adjacent second flat and straight portions;
wherein, for each second flat and straight portion paired with an adjacent first electrode sheet, the first separation portion and the second separation portion are positioned on opposite sides of that second flat and straight portion along the stacking direction and separate the corresponding first flat and straight portion from that second flat and straight portion;
wherein, for each said pair, the first extension portion is at least partially arranged on a side of the second flat and straight portion facing away from the first separation portion and is positioned between the first flat and straight portion and the second flat and straight portion, and the first bent portion connects the first separation portion to the first extension portion and is positioned on a side of the second flat and straight portion close to the first tab along the first direction;

wherein the first bent portion and the first extension portion are configured to separate the corresponding second flat and straight portion from the first tab when the first tab is inserted between the first flat and straight portion and the second flat and straight portion;

wherein, for each said pair, the second extension portion is at least partially arranged on a side of the first flat and straight portion facing away from the second separation portion, and the second bent portion connects the second separation portion to the second extension portion;

wherein both ends of each first flat and straight portion along the first direction include a first end portion and a second end portion, the first end portion being at least partially wrapped by the second bent portion, and the first tab being connected to a part of the first end portion not wrapped by the second bent portion;

wherein both ends of each second flat and straight portion along the first direction include a third end portion and a fourth end portion, the third end portion being closer to the first tab than the fourth end portion and being at least partially wrapped by the first bent portion;

wherein the second electrode sheet includes a plurality of second tabs, and each second tab is connected to a part of a corresponding third end portion not wrapped by the first bent portion, with a one-to-one correspondence between the second tabs and the second flat and straight portions; and wherein the first tab and each second tab are spaced apart from each other along a third direction perpendicular to the first direction and the stacking direction.

* * * * *